Aug. 10, 1965  C. M. HATHAWAY  3,199,619
LOAD SUSPENSION FOR RESISTANCE STRAIN GAGE WEIGHING
Filed July 2, 1962  4 Sheets-Sheet 1

INVENTOR.
CLAUDE M. HATHAWAY
BY
ATTORNEY

Aug. 10, 1965 C. M. HATHAWAY 3,199,619
LOAD SUSPENSION FOR RESISTANCE STRAIN GAGE WEIGHING
Filed July 2, 1962 4 Sheets-Sheet 2

INVENTOR.
CLAUDE M. HATHAWAY
BY
Richard W Hauser
ATTORNEY

Aug. 10, 1965
C. M. HATHAWAY
3,199,619
LOAD SUSPENSION FOR RESISTANCE STRAIN GAGE WEIGHING
Filed July 2, 1962
4 Sheets-Sheet 3
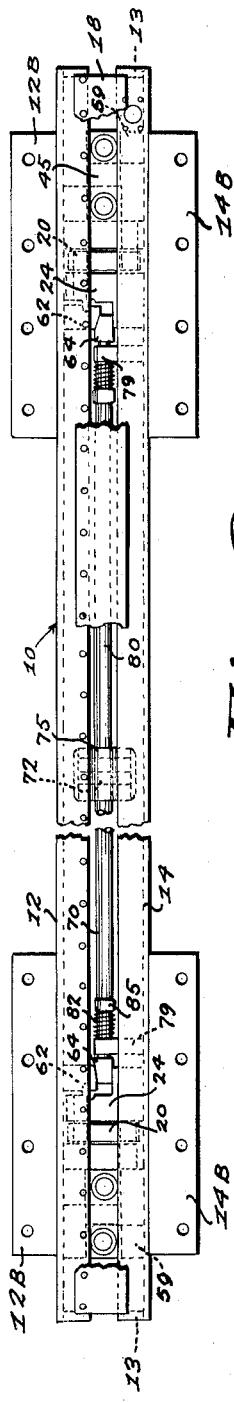
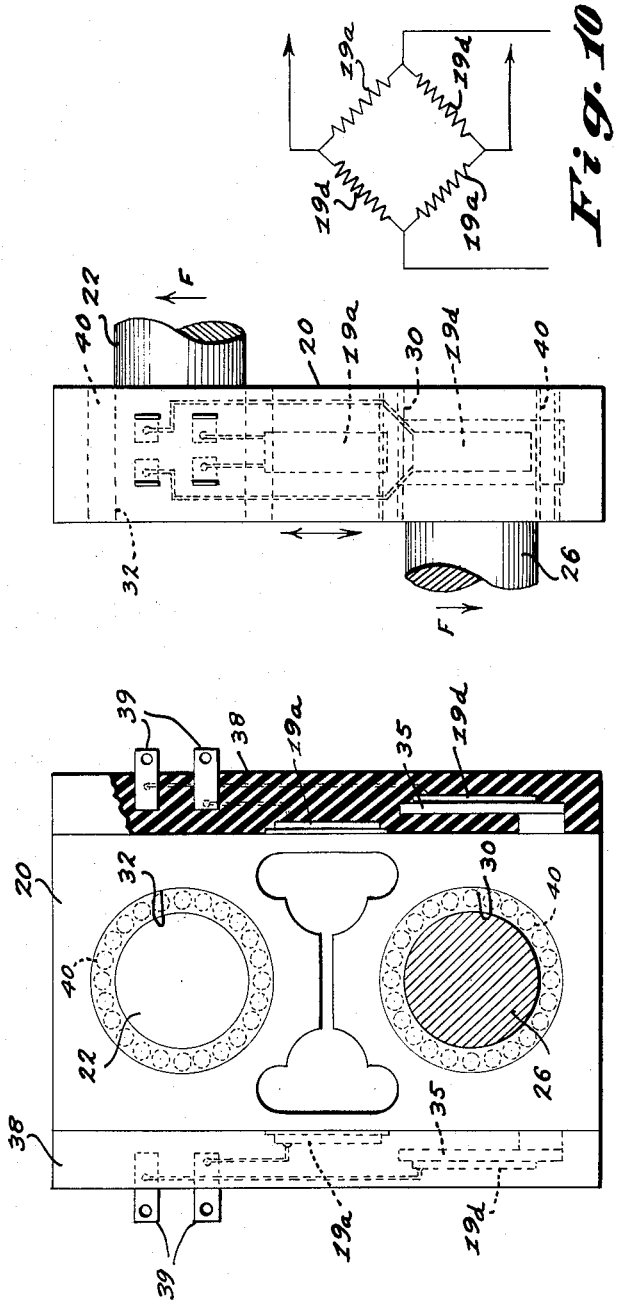
INVENTOR.
CLAUDE M. HATHAWAY
BY
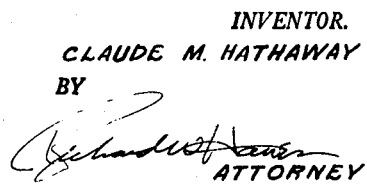
ATTORNEY Aug. 10, 1965   C. M. HATHAWAY   3,199,619
LOAD SUSPENSION FOR RESISTANCE STRAIN GAGE WEIGHING
Filed July 2, 1962   4 Sheets-Sheet 4
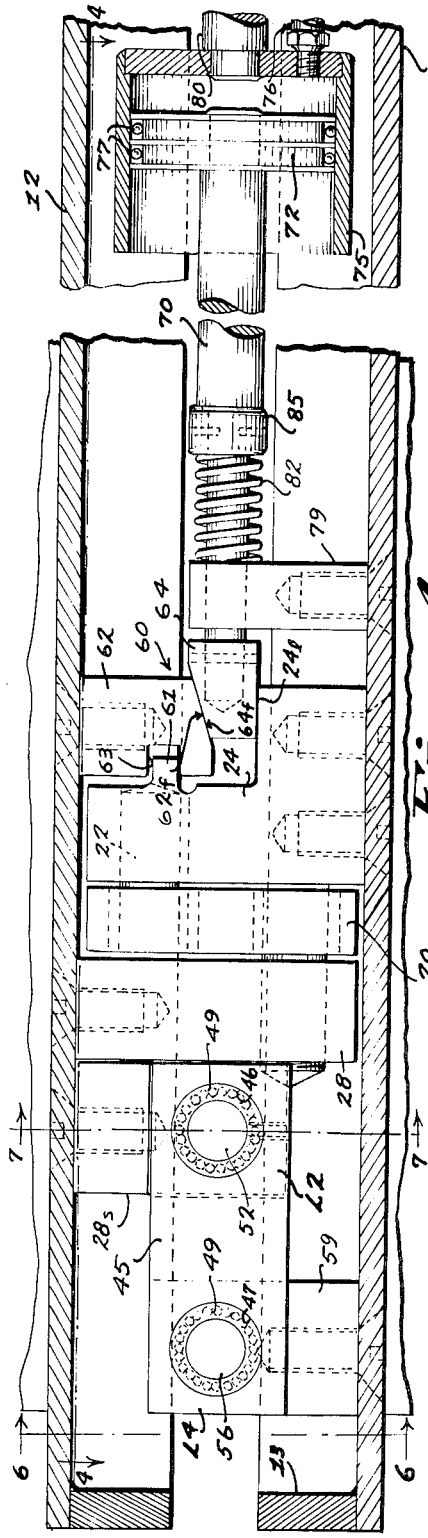
Fig. 4
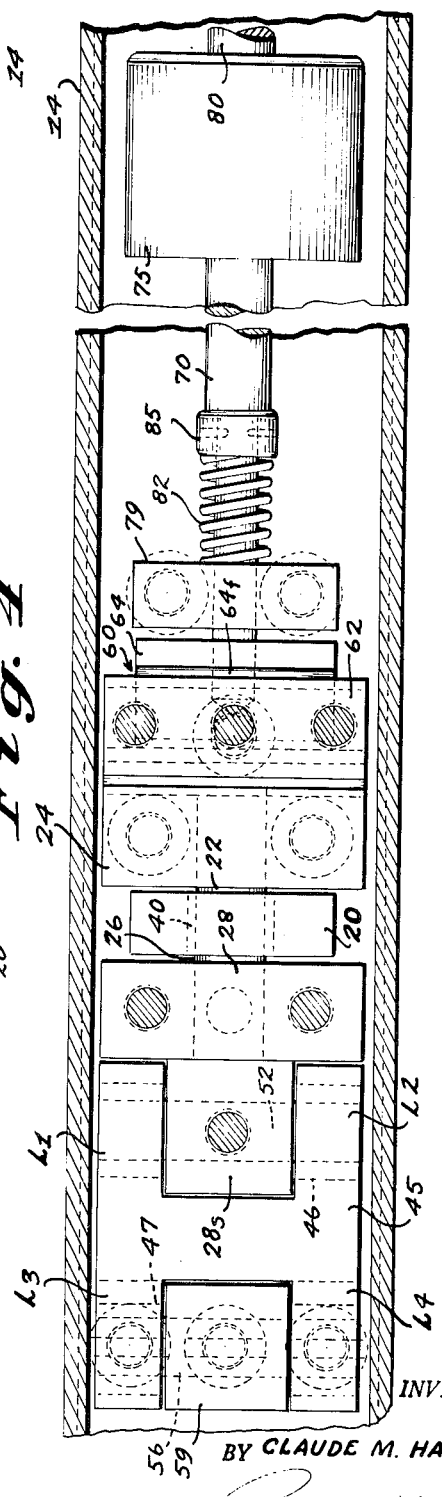
Fig. 5
INVENTOR.
BY CLAUDE M. HATHAWAY
ATTORNEY

United States Patent Office 3,199,619
Patented Aug. 10, 1965

3,199,619
LOAD SUSPENSION FOR RESISTANCE STRAIN GAGE WEIGHING
Claude M. Hathaway, Colorado Springs, Colo., assignor to Western Electrodynamics, Inc., a corporation of Colorado
Filed July 2, 1962, Ser. No. 206,679
12 Claims. (Cl. 177—136)

The present invention relates generally to weighing and load measurement and more specifically to a novel system of load suspension where the load weight is measured by the detection of the resultant strain of one or more resistance gages bonded to system tension members. Although not specifically so limited, the load suspension system is uniquely adapted for application between a truck body and its load carrying members to provide a constantly available load measuring system integral with the vehicle.

Strain gage weighing techniques have taken many forms which are familiar to those skilled in the art. Basic among these are systems which employ one or more compression load cells to support the weight of the load being measured, such as those used with ordinary platform scales. The strain of a tension member has also been utilized to measure weight when the load can be suspended by the member, as by use of a crane, for example. Compression cells have found by far the greatest employment in the field of weighing; however, neither they nor the tension member devices have ever been successfully integrated into a self-contained truck scale which may easily become an integral part of the truck. The largest difficulty in such a system is found in the attachment of the load to the load cells to achieve their proper operation, while at the same time stabilizing the load carrying portion of the truck to insure its structural integrity under all operating conditions.

Several other problems present themselves which have further complicated the objective. Compression deflecting members must take the form of some type of column if the stress on the member is to be pure compression, which it must be to obtain accurate outputs from the compression strain gages. For such a purpose columns have distinct disadvantages. Under longitudinal compression the cross-sectional area of a column tends to increase according to Poisson's ratio; however, the lateral expansion is not uniform or linear over the entire length of the column. Being in direct frictional contact with the support and the load, the ends of the column are restricted from making a free lateral expansion, the expansion of the end portions of the column taking place instead in steps or jumps as the compressive force on the member increases. Naturally, if this effect were felt on the attached strain gage, an undesirable non-linear measurement would result. This difficulty can be avoided to a large extent by providing a longer column wherein the step expansions are confined to the ends of the column and the strain gages are substantially isolated therefrom. Such a solution presents obvious problems with column instability and the creation of bending and shear stresses in the column, all of which produce inaccurate strain gage outputs. Load cells which use a plurality of columns to overcome the "end effect" require an exceptionally high degree of uniform length to achieve the desired result and even then are subject to many of the stated disadvantages of compression cells.

It is therefore the primary object of the present invention to provide an integral truck scale which will overcome the inherent problems and disadvantages found in the prior art.

A further object of the invention is to provide a tension member weighing device which may be utilized with conventional weighing platforms or like devices and which does not require that the load be lifted to weigh it.

Another object is to provide constant stabilization of the load being supported under transient conditions, while at the same time provide a support for the load which is strained in tension only.

A still further object of the invention is to provide deflection members which are small enough to give appreciable response to the loads which may reasonably be expected to be carried by highway vehicles, yet at the same time will, in combination with cooperating members, support and adequately stabilize a movable load.

Other and still further objects, features, and advantages of the present invention will become apparent upon a study of the following description of the invention, taken in conjunction with the accompanying drawings in which:

FIGURE 3 is a side elevational view of the load bar and weighing device of the present invention.

FIGURE 4 is a side elevational view of the weighing and stabilizing means in one end of the load bar with the sides of the top and bottom channel members broken away and shown in cross-section.

FIGURE 5 is a top plan view of one end of the load bar taken along lines 4—4 in FIGURE 4.

FIGURE 8 is an elevational view of the tension bar with a portion of the encapsulating layer broken away and shown in cross-section.

FIGURE 9 is a side elevational view of the tension bar.

FIGURE 10 is a circuit diagram showing the electrical connections of the resistance strain gages attached to the tension bar of FIGURE 8.

Briefly, in a system of the character comprising the present invention, a weighing unit is constructed of a bottom support member which mounts one or more bearing blocks. Each of the bearing blocks carries a normally protruding shaft from which is hung in the form of a pendulum, a tension member on whose sides strain gages are attached. The load is supported by the tension member by means of a second shaft or beam interconnecting the lower extremity of the tension member and a second bearing block rigidly secured to an elevated weighing platform. The load is placed on the platform which is positioned above the bottom support member in spaced apart relation thereto. A pivotally mounted stabilizing bar interconnects the support member and weighing platform, permitting free vertical movement of the platform in response to a load thereon, but restricting lateral, longitudinal, or rolling motion of the platform with respect to the support.

The preferred construction of the invention is illustrated in a form adapted for integral installation on a truck where the bottom support member is attached to the truck frame and the weighing platform is attached to the load carrying portion of the truck. A device providing a direct reading indication of the truck load can be invaluable where ordinary weighing facilities are not readily available or where the truck cargo is loaded and unloaded by weight, as a concrete mixer truck, for example. Although shown and described in connection with an integral truck installation, the broad teachings of the invention are understood to be limited only by the extent of the appended claims.

Figure 1:
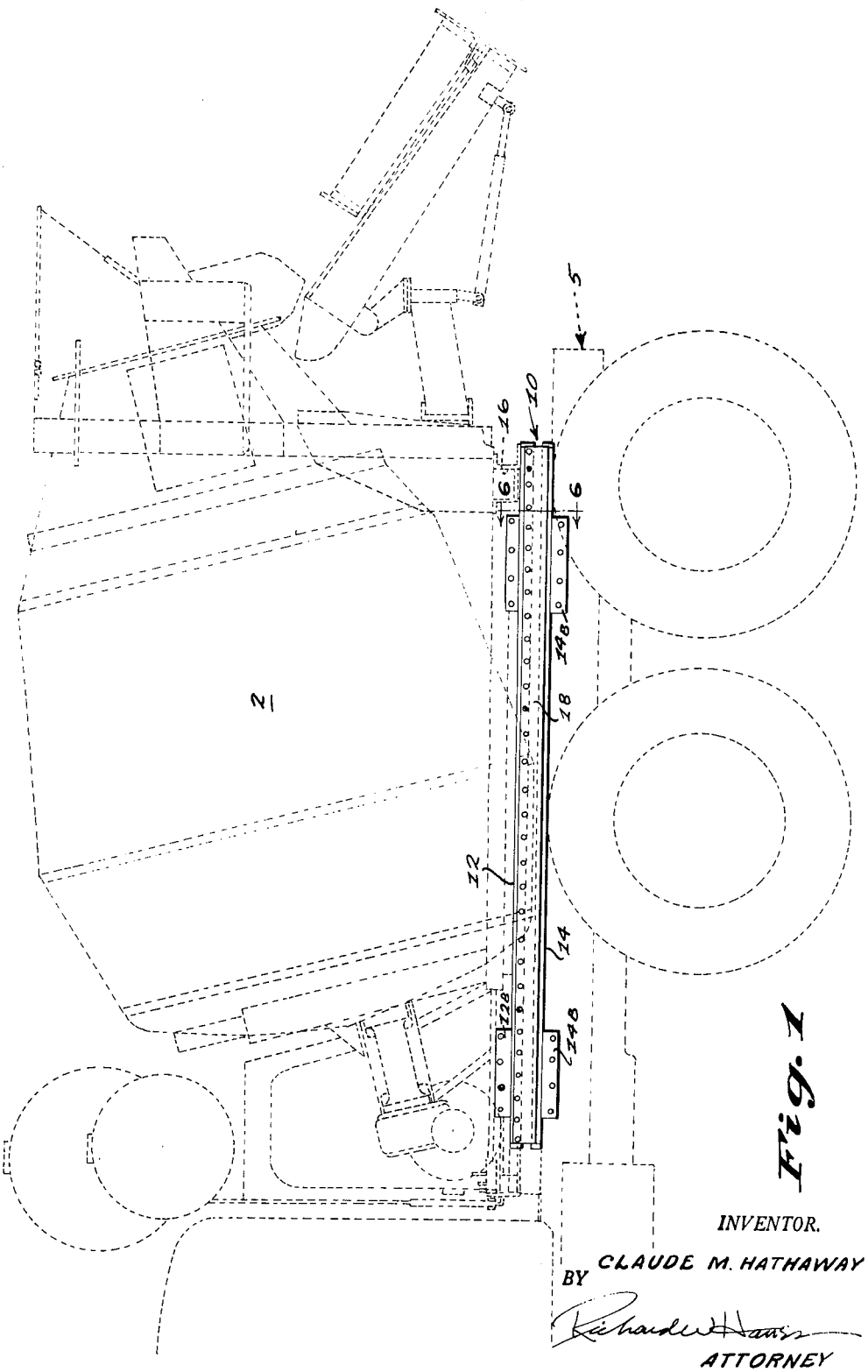
FIGURE 1 is a phantom side view of a concrete mixer truck showing a portion of the apparatus of the present invention in solid lines.
Figure 2:
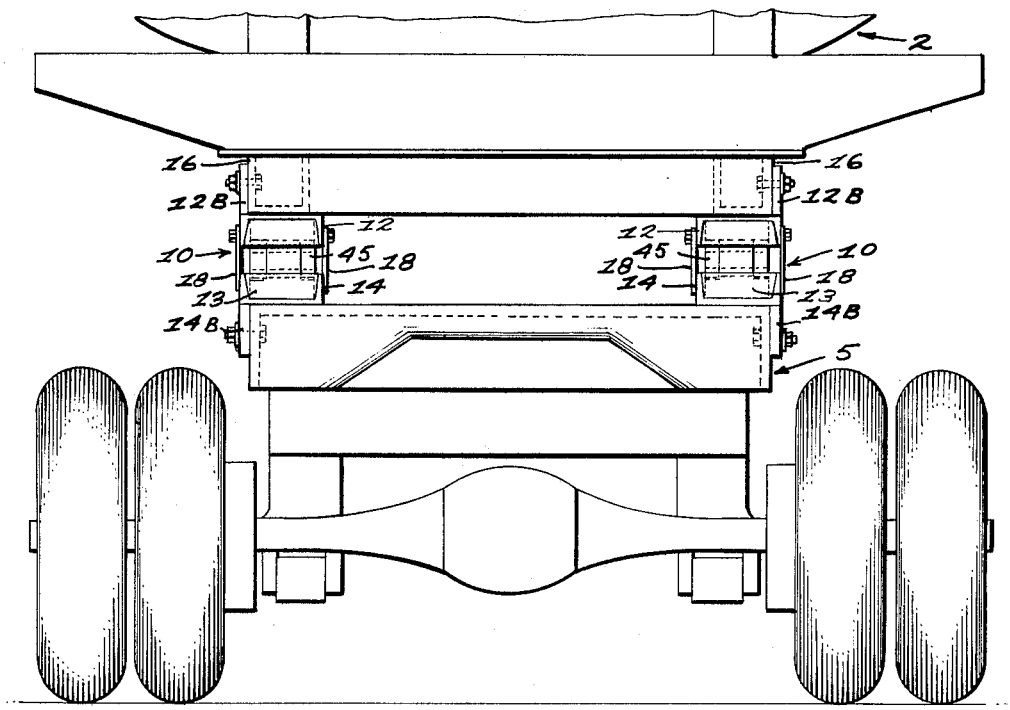
FIGURE 2 is a rear view of a vehicle illustrating the insertion of the load bars of the present invention between the truck frame and the chassis of the truck load.

Referring now to the drawings for a more detailed description of the present invention, there is shown in FIGURES 1 and 2 a truck mounted concrete mixer, generally indicated at 2, which is supported on the truck frame 5 by a pair of longitudinally arranged load bars 10 which comprise a portion of the apparatus of the invention. The two laterally spaced bars 10 are similar in their construction, except that one is intended for the left side of the truck body and the other for the right side, and hence only one of them will be described in detail.

Each of the load bars 10 includes a spaced apart top platform and bottom support member, 12 and 14 respectively, both similarly constructed of steel structural channel stock. The top and bottom channel members are respectively attached to the chassis 16 of the concrete mixer assembly and the frame 5 of the truck body by means of a plurality of bracket plates 12B and 14B. The bracket plates 12B and 14B are welded to their respective channel members 12 and 14 and are bolted, or otherwise rigidly secured to the mixer chassis 16 and truck frame 5 respectively. Strain gage weighing means are disposed in the inter space between the two channel members 12 and 14 close to the ends of each of the load bars 10, and when weighing the load, the combined weighing means in the two load bars provides a four corner suspension system for the truck mounted concrete mixer. The electrical output from each of the weighing means is totalled and translated into a meaningful figure of load weight by electrical apparatus which forms no part of the present invention. The interior of the load bars is protected from foreign materials by a pair of side flaps 18 which are secured to the sides of the top platform member 12 and overhang the sides of the bottom support member 14. The ends of each of the channel members are partially enclosed by end caps 13 which are shaped to the channel contour and welded in place to form a closed end.

The weighing means within the load bars are all identical and an explanation of one will therefore serve as a description of all. Measurement of the load weight is achieved through the use of bonded-wire strain gages 19a cemented to the longitudinal sides of a tension bar 20. As will become apparent as the discussion proceeds, the tension bar 20 is strained in tension by the action of the downwardly directed load force and the upward reaction of the means supporting the tension bar. The center portion of the tension bar 20 is relieved to reduce the cross-sectional area of the bar at the points under which the strain gages 19a are mounted in order to obtain sufficient strain of the steel bar lying under the strain gages 19a, to produce a usable output therefrom.

The tension bar 20 is hung by a cantilever shaft or beam 22 carried by a bearing block 24 which rests on and is rigidly fastened to the bottom support member 14. The load force is exerted in tension on the bar 20 through the top platform channel 12 and an attached platform bearing block 28 which mounts a load shaft 26. The load shaft 26 and the cantilever shaft 22 are received in vertically aligned lower and upper openings 30 and 32 respectively in the tension bar 20 and act upon the bar 20 to stretch it when a load is applied to the platform channel 12. As the bar 20 undergoes deflection the bonded strain gages 19a change resistance in a manner well known to the art and an output is obtained from the bridge circuit in which the gages are connected (see FIGURE 10). In this connection it will be noted that each tension bar 20 is equipped with two oppositely disposed active gages 19a which are bonded to the bar itself. A second pair of "dummy" strain gages 19d are bonded to a piece of steel 35 of the same type as the bar, but which undergoes no stress or strain, except that due to temperature variation. The "dummy" gages are incorporated into the electrical bridge circuit to provide temperature compensation as is also well known in the art. The strain gages are protected from damage and moisture by an encapsulating layer of vulcanized silicone rubber 38 bonded to the sides of the tension bar after the strain gages and electrical leads and terminals 39 are in place.

The cantilever and load shafts 22 and 26 are carried at each of their ends in annular needle bearings 40 lining the openings 30 and 32 in the tension bar. The bearings 40 permit free pendulum movement of the tension bar about the cantilever shaft as its pivotal center to insure the absence of unwanted bending or twisting movements in the tension bar 20 if the load is not centered directly above the weighing means when measurements are being taken.

The four corner suspension of the truck load on the four weighing means within the load bars 10 provides a high degree of stability for the load, however to further safeguard and isolate the tension bar 20 from unwanted bending or twisting movements which might tend to be present therein, an H shaped stabilizing member 45 pivotally interconnects the bottom and top channels 14 and 12. Suitable bearings 49 are provided in coaxial apertures 46 in the opposing legs $L_1$ and $L_2$ of the H shaped stabilizer 45 to receive a horizontally positioned first spindle 52 carried by the stem portion 28s of the T shaped platform bearing block 28 (see FIGURE 4). Bearings 49 are similarly disposed in coaxial openings 47 in the opposite legs $L_3$ and $L_4$ of the stabilizer 45 to receive the ends of a second spindle 56 which is carried by a bearing pedestal 59 secured to the bottom channel member 14. It will be obvious from the construction of the stabilizer 45 and its operative interconnection to the top and bottom channel members 12 and 14 that its function limits the top platform channel to only one degree of freedom which is solely within a plane coincident with the axis of the vertically aligned cantilever and load shafts 22 and 26.

Figures 6, 7:
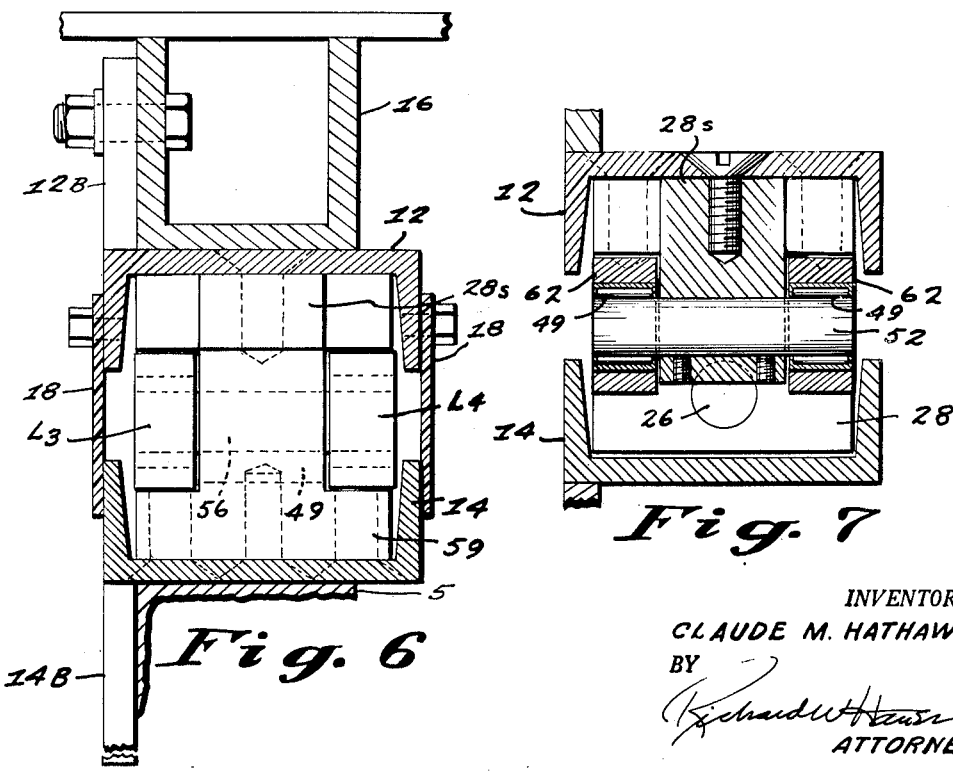
FIGURE 6 is an end elevational cross-sectional view taken along lines 6—6 in FIGURES 1 and 4.
FIGURE 7 is an elevational cross-sectional view taken along lines 7—7 in FIGURE 4.

It is unnecessary for integral truck scales to provide a continuous indication of load weight. If the information can be obtained during periods of loading or unloading when the vehicle is substantially level and is stationary the purpose of the scales will be served. Hence it is desirable from the standpoint of bearing wear and the possibility of over-stressing the strain gages that the load be firmly supported by a non-weighing member while the vehicle is in motion. In the preferred embodiment of the invention this objective is achieved through the use of spacer assembly 60 which is of sufficient strength and rigidity to support the load in compression by being interposed between the top platform channel 12 and the support channel 14 to accept a transfer of the load from the tension bar 20. The spacer assembly 60 comprises a platform-mounted spacer block 62 positioned directly above a horizontal ledge $24_1$ on the support bearing block 24 which block is also included in the assembly, and a reciprocally movable wedge 64, having an inclined face 64f and arranged for movement into a position between the bearing block ledge $24_1$ and a complementary inclined lower face 62f on the spacer block 62. In operation, the wedge 64 is forcefully driven into position between the aforesaid members, providing a fixed separation between the upper and lower channels 12 and 14. A protruding lip 62 of the support bearing block 24 engages the lower edge surface of a notch 63 in the platform-mounted spacer block 62 thus establishing a stop or limit to the upward movement of the platform channel 12. Ideally, the dimensions of the components of the spacer assembly 60 should be such that when the wedge 64 is forced into place between its two abutting surface 62f and $24_1$ the entire weight of the load is transferred from the tension bar 20 to the spacer assembly 60. It will be apparent, however, that very critical dimensioning of the components would be required to achieve such precision. In practice there is no need for such critical operation of the device, for the primary purpose of the rugged spacer assembly is not to remove all weight from the tension bar 20 but to shield the tension bar and associated bearings 40 by absorbing the forces of acceleration and deceleration in the load when the vehicle is in motion. When the wedge 64 is withdrawn from contact with the spacer block face 62f and ledge 24₁, the load is again fully supported by the tension bar 20 and a weight measurement can be made. The wedge 64 is reciprocated between its two positions by a connected piston rod 70 disposed along the longitudinal center line of the load bar 10. The piston rod 70 terminates near the mid-section of the load bar 10 in a circular piston 72 which is received in the open end of a cylindrical fluid cylinder 75. The piston is provided with appropriate O-ring seals 77 which prevent leakage from the cylinder interior. The closed end of the cylinder 75 is attached to a second reciprocating rod 80 serving similarly to piston rod 70 to operate the wedge member 64 in the corresponding weighing mechanism at the opposite end of the load bar 10, as will best be seen by reference to FIGURE 7. The fluid cylinder 75 and piston 72 being free to mutually reciprocate, the introduction of fluid pressure into the interior of the cylinder 75 through the bushing 76 forces the piston rod 70 and second reciprocating rod 80 in diametric directions to move the wedges 64 at the extreme ends of the rods into their locking positions, as explained above. The pair of actuating rods are each supported at their extremities by a bearing pier 79 secured to the bottom channel member 14 of the load bar 10.

To disengage the wedges 64 when the fluid pressure is released from the cylinder 75, a spiral biasing spring 82 surrounds the actuating rod and is abutted between the fixed bearing pier 79 and a collar 85 suitably attached to the rod inwardly from the pier 79. It will be obvious that when the rods move the wedges 64 toward their locking position the springs 82 will be biased to furnish an axial force tending to remove the wedges 64 from their locking position.

Having thus described the several useful and novel features of the load suspension system of the present invention in connection with the accompanying drawings, it will be seen that the many worthwhile objectives for which it was designed have been achieved. Although but one of the several possible embodiments of the invention has been illustrated and described herein, I realize that certain additional modifications may well occur to those skilled in the art within the broad teaching hereof; hence, it is my intention that the scope of protection afforded hereby shall be limited only insofar as said limitations are expressly set forth in the appended claims.

I claim:

1. A load suspension system for resistance strain gage weighing means including:
   a lower support member;
   an upper weighing platform adapted to support the load to be weighed, superimposed over the lower member and spaced therefrom;
   a plurality of weighing means disposed in the interspace between the support member and the weighing platform;
      said weighing means each comprising;
         a support bearing block rigidly secured to the top side of the lower support member;
         a platform bearing block rigidly secured to the underside of the weighing platform and laterally spaced from the support bearing block;
         a load bar disposed between said bearing blocks and having resistance strain gages bonded thereto and having top and bottom apertures therein;
         a cantilever beam having one end disposed in said top aperture of the load bar and its other end supported by the support bearing block;
         a load carrying beam having one end disposed in said bottom aperture of the load bar and its other end mounted in the platform bearing block;
   and a like plurality of stabilizer bars pivotally interconnecting the lower support member and the upper weighing platform, said pivotal connections having parallel axes of rotation which axes are substantially perpendicular to the direction of gravitational force exerted on the load being weighed.

2. The combination as set forth in claim 1, and further including;
   a pair of spacer means for maintaining the lower support member and weighing platform in a fixed spaced apart relation each comprising;
      a pair of vertically spaced apart abutments secured respectively to the top side of the lower support member and the underside of the weighing platform, one of said abutments having an inclined inner face;
      a reciprocally movable wedge means interposed between said abutments; and
      means operatively connected to the wedge for moving it into and out of engagement with the said abutments.

3. The combination of claim 2 wherein the means operatively connected to the wedge comprise;
   a piston rod;
   a fluid pressure cylinder; and
   a piston connected to said rod and slidably disposed in the fluid pressure cylinder.

4. A weighing device comprising;
   a rigid base support member having a bearing surface;
   a load receiving platform member superimposed above the base support member and spaced therefrom;
   elastic means forming an elongate tension member interposed perpendicularly between and spaced apart from the base support member and the platform member;
   first bearing means attached to the base support member and connected to that end of the elastic means which is most remote from the base support member;
   second bearing means attached to the platform member and connected to that end of the elastic means which is most remote from the platform member; and
   strain responsive means operatively attached to the tension member for producing an output as a function of the strain in said tension member.

5. The combination as set forth in claim 4 and wherein the said connections between the bearing means and the tension member are pivotal about axes substantially parallel to the load platform member.

6. The weighing device of claim 4 and further including;
   means pivotally interconnecting the base support members and the platform members.

7. The weighing device of claim 4 and further including;
   spreader means movably mounted for contact with the base member and platform member and adapted to relieve the strain on the tension responsive load cell; and
   actuator means operably coupled to the spreader means for positioning the spreader means.

8. A weighing device comprising;
   a base having a bearing surface;
   a load receiving platform above the base;
   a plurality of elastic load cell elements interposed between the base and the load receiving platform wherein the top and bottom of each of said elements are spaced from the said platform and base respectively;

means operatively interconnecting the top portion of each of said elastic elements with the bearing surface of the base;

means operatively interconnecting the bottom portion of each of said elastic elements with the load receiving platform;

strain gage means carried by each of the said elastic load cell elements intermediate the top and bottom portions thereof; and stabilizing means pivotally interconnecting the said base and platform and including, a rigid stabilizer bar, and two parallel spindles journaled in the bar and carried respectively by the base and platform.

9. The weighing device as set forth in claim 8, wherein the elastic load cell element comprises an elongated metalic member having longitudinally aligned support receiving apertures near the ends of the element and having a centrally located laterally extending relieved portion defining a pair of parallel load carrying legs along the sides of the element.

10. The weighing device of claim 9, wherein the parallel load carrying legs exhibit surface strains which are related in magnitude to the tension loads on said elastic element and wherein the strain gage means carried by said element comprise;

first and second active strain gages attached to the strained surface areas of the two legs;

first and second dummy strain gages attached to a non-strained surface area of said element, said first and second active gages occupying opposing positions in a serially connected electric bridge circuit which includes the first and second dummy strain gages.

11. In a weighing device, the combination including;

a base;

a load platform spaced apart from and substantially parallel to the base;

load cell means interposed between the base and the platform and operatively connected to the said base and platform so as to support the load platform;

spreader means movably mounted between the said base and platform and adapted to support the said platform as a compression member; and actuator means operably connected to the spreader means for positioning the spreader means for said support.

12. In a load measuring device the combination comprising;

a base member;

a load platform spaced apart from and substantially parallel to the base member;

means attached to the base and the load platform and pivotally interconnecting the said two members together, said connections being pivotal about at least two mutually perpendicular axes which are parallel to the said platform, and said interconnecting means including a tension responsive load cell.

References Cited by the Examiner

UNITED STATES PATENTS

| | | | |
|---|---|---|---|
| 2,487,595 | 11/49 | Ruge | 73—141 |
| 2,534,766 | 12/50 | Girdwood-Blackett | 177—141 |
| 2,704,661 | 3/55 | Maugh | 177—137 |
| 2,814,946 | 12/57 | Harris | 73—141 |
| 2,923,540 | 2/60 | Yost et al. | 177—137 |
| 3,063,576 | 11/62 | Hofmeister | 177—139 X |

FOREIGN PATENTS 468,718   10/50   Canada.

LEYLAND M. MARTIN, *Primary Examiner.*

LEO SMILOW, *Examiner.*